United States Patent
Rao

(10) Patent No.: US 7,809,811 B1
(45) Date of Patent: Oct. 5, 2010

(54) SYSTEM AND METHOD FOR OPERATOR NETWORK CAPABLE OF PROBLEM DETERMINATION AND SOLUTION DEPLOYMENT

(75) Inventor: Bindu R. Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 11/374,481

(22) Filed: Mar. 9, 2006

Related U.S. Application Data

(60) Provisional application No. 60/660,683, filed on Mar. 9, 2005.

(51) Int. Cl.
*G06F 15/173* (2006.01)
(52) U.S. Cl. .................. 709/221; 714/37; 717/168; 717/178
(58) Field of Classification Search .......... 709/221, 709/223–225; 714/37, 44, 46; 717/168–178
See application file for complete search history.

(56) References Cited

U.S. PATENT DOCUMENTS

| | | | |
|---|---|---|---|
| 6,321,348 B1 * | 11/2001 | Kobata | 714/37 |
| 6,697,969 B1 * | 2/2004 | Merriam | 714/46 |
| 6,785,834 B2 * | 8/2004 | Chefalas et al. | 714/4 |
| 6,789,215 B1 * | 9/2004 | Rupp et al. | 714/38 |
| 6,832,373 B2 * | 12/2004 | O'Neill | 717/171 |
| 6,925,300 B2 * | 8/2005 | Horne | 455/423 |
| 7,171,660 B2 * | 1/2007 | McCaleb et al. | 717/171 |
| 7,324,815 B2 * | 1/2008 | Ross et al. | 455/425 |
| 2002/0095615 A1 * | 7/2002 | Hastings et al. | 714/4 |
| 2003/0043180 A1 * | 3/2003 | Gusler et al. | 345/708 |
| 2003/0110412 A1 * | 6/2003 | Neville | 714/25 |
| 2004/0049394 A1 * | 3/2004 | Burger et al. | 705/1 |
| 2004/0153327 A1 * | 8/2004 | Liu et al. | 705/1 |

* cited by examiner

*Primary Examiner*—Duyen M Doan

(57) ABSTRACT

Aspects of the present invention may be seen in a network for customer care and distribution of update packages to electronic devices. The network supports efficient manage and update of firmware and software in electronic devices. A provisioning server in the network may employ provisioning means to update configuration, provision devices, and manage devices. The network may comprise an electronic device capable of receiving update packages. The electronic device may comprise an update agent capable of updating the electronic device; a diagnostic client that facilitates remote diagnosis; and a traps client that facilitates setting traps and retrieving collected information.

15 Claims, 3 Drawing Sheets

SYSTEM AND METHOD FOR OPERATOR NETWORK CAPABLE OF PROBLEM DETERMINATION AND SOLUTION DEPLOYMENT

RELATED APPLICATIONS

This patent application makes reference to, claims priority to and claims benefit from U.S. Provisional Patent Application Ser. No. 60/660,683, entitled "Operator Network Capable of Problem Determination and Solution Deployment," filed Mar. 9, 2005.

The complete subject matter of the above-referenced United States Provisional Patent Application is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. This firmware and application software often contain software bugs. New versions of the firmware and software are periodically released to fix the bugs or to introduce new features, or both. If firmware or firmware components are to be changed in electronic devices, it is often very a complicated and tricky process to update the firmware components Often, it is difficult to determine what is wrong with a device when a problem is encountered. Additionally, a customer care representative for an operator may not have answers to a customer's device problems and may not be able to fix them. Determination of problems with a customer's electronic device is one of the big problems that operators often encounter. Answering customer care calls can also become quite expensive, especially so if at the end of such a call, the customer care representative is unable to determine what is wrong with the device.

Customer care centers get numerous calls for support from customers, yet they have very few means to determine what is wrong with a device. The Customer Care Representative (CCR), also referred to as a Customer Service Representative (CSR), often asks questions of a customer, but usually does not get proper answers. Customers often do not know what is wrong with their device. As a result, configuration changes that can fix a problem cannot be easily determined, and firmware updates that can fix the problem cannot be identified.

Usually, even when a problem is diagnosed, a solution may not be readily available. Thus, customers who call to report a problem are often left without having the problems with devices solved.

Additionally, an operator may need to update millions of phones to fix a known bug; an activity that can get very expensive and consume a lot of resources. There is no easy way to conduct mass updates of millions of electronic devices.

Further limitations and disadvantages of conventional and traditional approaches will become apparent to one of ordinary skill in the art through comparison of such systems with the present invention.

BRIEF SUMMARY OF THE INVENTION

A system and/or method for determining problems with electronic devices in an operator's network, and, more specifically, for using a network that supports customer-care-based management of mobile electronic devices, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to determining problems with electronic devices such as, for example, a mobile handset in an operator's network. More specifically, the present invention relates to the use of a network that supports customer care based management of electronic devices. Although the following discusses various aspects of the present invention in terms of a mobile handset or device, it should be clear that the following also applies to other mobile electronic devices such as, for example, personal digital assistants (PDAs), pagers, personal computers (PCs), and similar handheld electronic devices.

Figure 1:
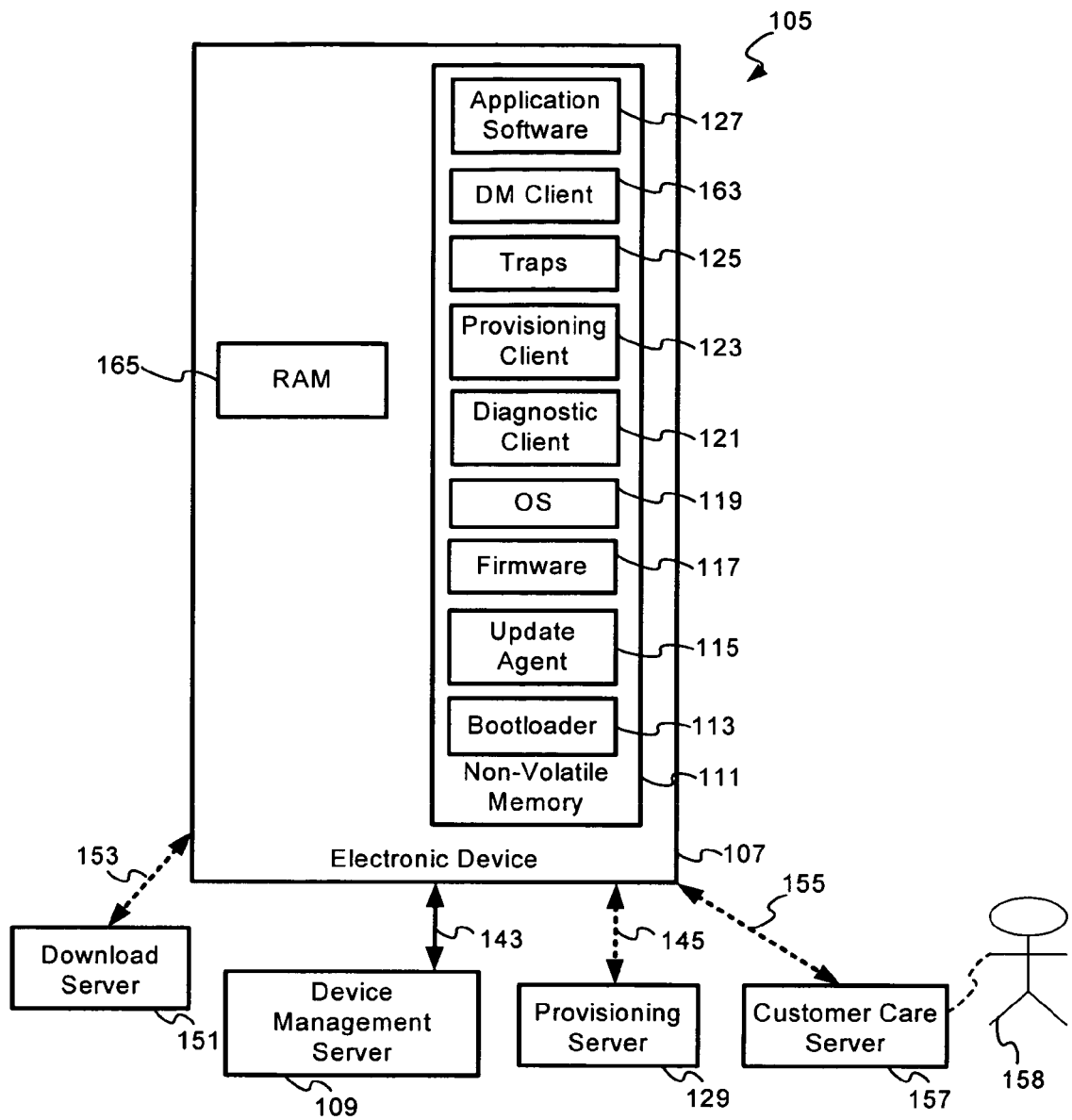
FIG. 1 illustrates a block diagram of an exemplary network, in accordance with an embodiment of the present invention.

FIG. 1 illustrates a block diagram of an exemplary network 105, in accordance with an embodiment of the present invention. The network 105 may diagnose problems with electronic devices such as, for example, the electronic device 107, and disseminate solutions based on a dissemination policy. The network 105 may mass-distribute firmware and software updates to fix problems that have been diagnosed with mobile devices.

The network 105 may comprise a device management (DM) server 109, a customer care server 157, a download server 151, an electronic device 107, and a provisioning server 129. The electronic device 107 may comprise random access memory (RAM) 165 and non-volatile memory 111

(e.g. FLASH, EEPROM, battery-backed RAM, etc.) The non-volatile memory 111 may comprise boot-loader 113, update agent 115, firmware 117, operating system (OS) 119, diagnostic client 121, provisioning client 123, traps 125, device management (DM) client 163, and application software 127. The electronic device 107 may be communicatively coupled to the DM server 109, the customer care server 157, the download server 151, and the provisioning server 129 via communication links 143, 155, 153, and 145, respectively. Each of the communication links 143, 155, 153, and 145 may comprise a wireless or a wired link such as, for example, a cellular network, a paging network, a wireless wide area or local area network, a packet network, an intranet network, the Internet, a circuit switched network, and a public switched telephone network (PSTN). Additionally, the customer care server 157 may be accessible by a customer care representative (CCR) 158.

The download server 151 may deliver an update package to the electronic device 107, which may employ the update package to update the application software 127, the operating system (OS) 119, or the firmware 117, for example. The electronic device 107 may also receive provisioning information from the customer care server 157 or the provisioning server 129 to fix configuration problems or to reconfigure software and hardware. The electronic device 107 may apply updates using at least one update agent 115, which may process update packages or portions thereof. The electronic device 107 may receive update packages and utilize the at least one update agent 115 to update the electronic device 107.

In an embodiment of the present invention, an update package may comprise executable instructions used to update firmware/software in the device 107 or convert firmware/software from one version to another.

The diagnostic client 121 may facilitate remote diagnosis and the traps client 125 may facilitate setting traps and retrieving collected information. The DM client 163 may interact with the provisioning client 123, the diagnostic client 121 and the traps client 125. The DM client 163 may also receive DM commands from the DM server 109 and implement them. The DM server 109 and the DM client 163 may be compatible with a device management protocol such as, for example, the Open Mobile Alliance (OMA) Device Management (DM) protocol.

The download server 151 may assist in downloading firmware and software updates to the electronic device 107. The customer care server 157 may facilitate access to the information in the electronic device 107 by customer care representatives (CCR) 158. The provisioning server 129 may facilitate communication of provisioning information, over a communication link 145, to the electronic device 107. The communication link 145 may be over-the-air (OTA) or wired.

In an embodiment of the present invention, when a CCR 158 receives a call from the user of the electronic device 107, the customer care server 157 may be used by the CCR 158 to: set parameters in the device to solve a problem in the electronic device 107; automatically turn on collection of one or more quality of service (QoS) parameters from the electronic device 107; set traps to determine average download time in the electronic device 107, average number of dropped packages per download, and average number of attempts per successful download, for example; and retrieve collected data from traps and other device related information from the electronic device 107 during the call to the CCR 158 from the user of the electronic device 107.

In an embodiment of the present invention, the network 105 may determine that the electronic device 107 is in the vicinity of a fixed set of routes (e.g., main roads and towns) based on a determination of its location, during a predetermined-monthly cycle. When the network 105 determines that the electronic device 107 is in the vicinity of a fixed set of routes, the network 105 may cause the electronic device 107 to collect data, make a call for a specific duration, etc. (e.g., involving mobile originating or mobile termination) so as to measure QoS parameters such as, for example, failure to set up or failure to hold the call or collect information for a required duration, for example, 2 minutes. In an embodiment of the present invention, while the CCR 158 receives a call from the user of the electronic device 107 to report a problem, the customer care server 157 may provide the CCR 158 with a drop down list of QoS parameters that can be collected from the electronic device 107, providing the CCR 158 with the opportunity to turn on the collection of the QoS parameters from the electronic device 107 for a specified duration such as, for example, a month.

The network 105 may support mass distribution of firmware and software updates using methods that may be employed by the device management server 109 or the customer care server 157. The network 105 may, for example, employ the OMA-DM protocol that may be supported by the DM server 109, or other protocols, for device discovery. The DM server 109 may use an OMA-DM message comprising a 'Replace' command to set 'configuration' parameters that may be used to fix bugs in software or firmware. The update agent 115 may update the electronic device 107 using update packages, which may be retrieved based on a parameters set. The electronic device 107 may ensure that the update packages received are not corrupt, and may store them away for subsequent processing. In an embodiment of the present invention, the provisioning server 129 may support provisioning of devices using OMA client provisioning (CP) means, OMA-DM bootstrap provisioning means, and other legacy means. The provisioning server 129 may employ one of several available broadcast means to communicate an update package to a plurality of electronic devices 107 such as, for example, short message service (SMS), or multimedia messaging service (MMS).

In an embodiment of the present invention, the CCR 158, with the help of the customer care server 157, may initiate the collection of QoS parameters from the electronic device 107, when the user of the electronic device 107 calls the CCR 158 to report a problem with the electronic device 107. The customer care server 157 may facilitate collection of fault incidence and repair information, fault incidence information, time taken to clear the faults, and accumulated down time of device or service, for example. The customer care server 157 may also facilitate collection of information from the electronic device 107 related to network performance, call success rate within the network, service access delay information, call drop rate, and percentage of connections with good voice quality, for example.

In an embodiment of the present invention, the network 105 may collect information about the electronic device 107 to determine any problems associated with the electronic device 107 and route an incoming call accordingly. The network 105 may comprise the technology to create a problem report for the electronic device 107 and route the incoming calls from the electronic device 107 to CCR 158 based on the problems associated with the electronic device 107 and based on the expertise of the CCR 158, thereby optimizing the process by which problems may be fixed.

Some exemplary problems associated with the electronic device 107 and that may be detected by the network 105 may be: a new complex electronic device 107 that has not yet been used in the network 105; changed network parameters or changed configurations in the network 105 that have not been reflected in the electronic device 107; faulty hardware that may have intermittent problems; and newly released software causing problems in the electronic device 107. In an embodiment of the present invention, the network 105 may be capable of detecting such problems and running a report that may include, for example, the frequency and/or pattern of their occurrence. The frequency of occurrence of a problem may, for example, indicate that the feature is used frequently by a majority of subscribers in the network 105.

When problems arise in an electronic device 107 in the network 105, traps may be set in the electronic device 107 to collect detailed information from the electronic device 107. Data collected from traps may be stored in a database to which OEMs are provided access, so as to determine a solution to the problem, based on real data collected. A problem report may be generated and utilized by a CCR 158 to provide a temporary solution for the problem if longer time is needed to provide a more permanent solution. Once a permanent solution is available, the CCR 158 may ensure that the permanent solution is provided. Each subscriber to whom a temporary solution is delivered may be tracked so as to set traps in their devices, collect raw data from these traps, and provide the subscribers with a temporary solution first and then provide them with a more permanent solution. In an embodiment of the present invention, other subscribers with similar electronic devices 107, who do not experience the problem or do not report it, may be provided with the permanent solution.

Various traps may be set to collect detailed raw data from the electronic devices 107 reporting problems. After reviewing raw data from trap data collected from multiple electronic devices 107, an original equipment manufacturer (OEM) may come up with a temporary solution while, in parallel, developing a more permanent solution. Such a temporary solution provided by an OEM may be disseminated to the electronic devices 107 that have reported a problem, and a list of such electronic devices may be maintained so as to be able to provide a permanent solution, once it is developed, to them first, before it is disseminated to all the other electronic devices/subscribers. Therefore, the list of electronic devices that have reported a problem may become a target for a "bulk" update of a temporary solution, and a list of devices to which a temporary solution has been delivered may be used for a "bulk" update of a more permanent solution.

When a solution, temporary or permanent, has been developed, the customer care server 157 may distribute the solution to a number of electronic devices 107. Therefore, a bulk push solution may be utilized. For the situation where a temporary solution is to be disseminated, the list of electronic devices for which a problem report has been generated may be the target for the bulk push. For the dissemination of a more permanent solution, there may be several choices, and each of the choices may utilize a bulk push operation. For example, the permanent solution may be pushed to the electronic devices for which a problem report has been created. Other electronic devices that have not reported any problems may be left alone. Alternatively, depending on the nature of the problem and the features involved, every electronic device, whether it has encountered a problem or not, whether it has reported a problem or otherwise, may be a target for an update with the permanent solution.

Figure 2:
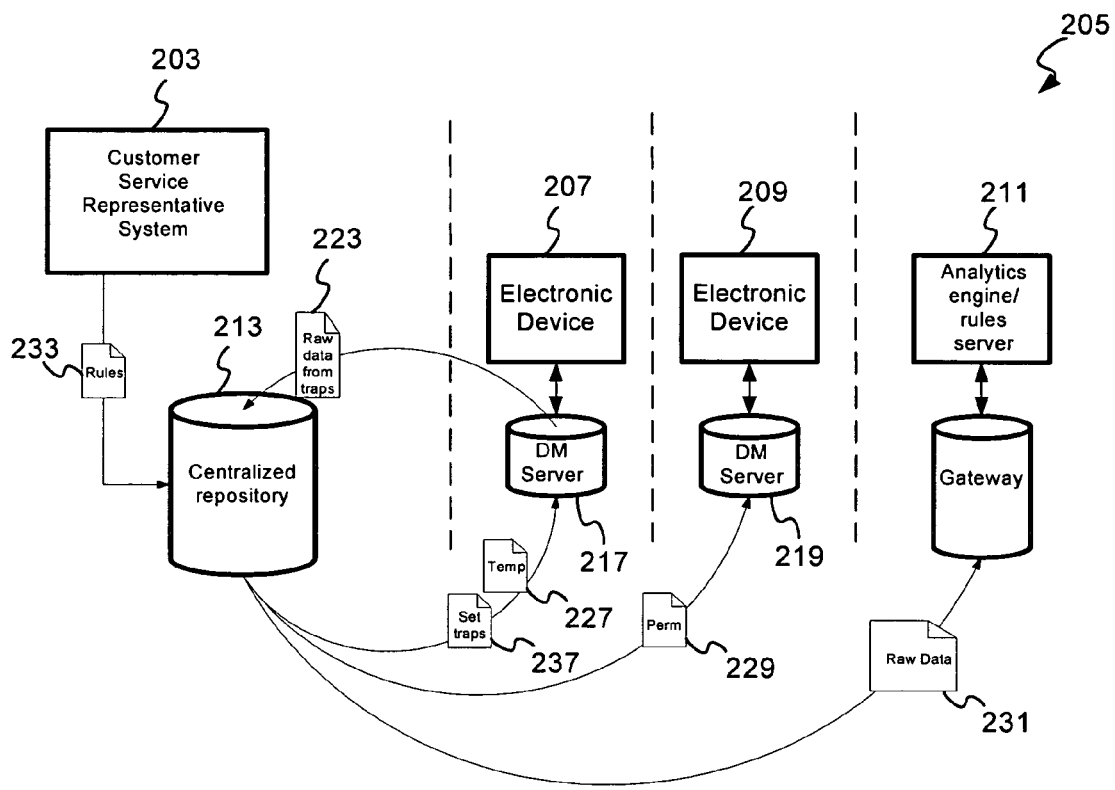
FIG. 2 illustrates a block diagram of an exemplary network, in accordance with an embodiment of the present invention.

FIG. 2 illustrates a block diagram of an exemplary network 205, in accordance with an embodiment of the present invention. The network 205 may comprise a customer service representative (CSR) system 203, an analytics engine/rules server 211, and electronic devices such as, for example, the electronic devices 207 and 209. The electronic device 207 may correspond to, for example, the electronic device 107 of FIG. 1. The network 205 may comprise the technology to route incoming customer care calls from electronic devices 207 and 209 to the CSR system 203, such that the calls go to CCRs that are determined to be an expert in a particular electronic device, a particular software, or a particular set of problems. Problem reports may come into the centralized repository 213 from the electronic devices 207. When a number of problem reports is collected and analyzed by the analytics engine/rules server 211, an operator may determine if the problem is widespread within the electronic devices 207 of the network 205 or is only device-specific and limited to the electronic device 207 that reported the problem.

The CSR system 203 may set certain rules 233, which may be used to determine the allocation of problems to the different CCRs in the CSR system 203 based on their expertise and the nature of the problems.

An electronic device 207 may run into problems such as those discussed hereinabove. Through the DM server 217, the electronic device 207 may communicate the presence of problems to the CSR system 203, which may provide the electronic device 207 with a temporary solution 227 for the problem. The temporary solution 227 may be created by the OEM of the electronic device 207 via the analytic engine/rules server 211. The CSR system 203 may then set traps 237 in the electronic device 207 to collect detailed information about the problems in the electronic device 207. Data 223 collected from traps 237 may then be stored in a database in the centralized repository 213, to which the analytics engine/rules server 211, for example, of the OEMs is provided access, so as to determine a solution to the problem, based on real data collected and provided to the OEMs as raw data 231. The OEMs may then determine a permanent solution for the problem and provide it to the CSR system 203. The CSR system 203 may then send the permanent solution to the electronic device 207, which reported the problem. The CSR system 203 may then track similar electronic devices 209 and provide them with the permanent solution 229 to the problem, and via a DM server 219, even though they may not have reported the problem.

The raw data 231 that the CSR system 203 gets from the electronic devices 207 having a problem may be valuable to the OEMs who can analyze the problem rather than guess as to what the problem may be. As a result the time used to create a solution may be cut down. Additionally, providing the raw data may enable the determination of the efficacy of solutions provided by means of other traps.

Figure 3:
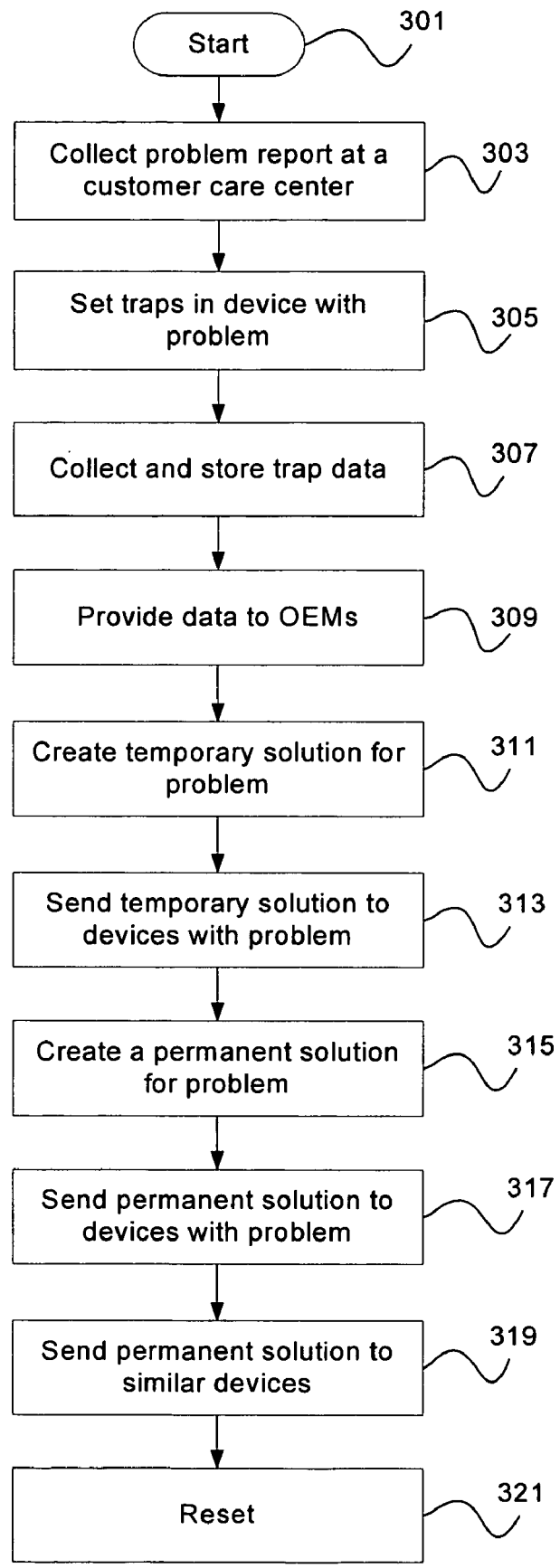
FIG. 3 illustrates a flow chart of an exemplary process of determining problems and deploying solutions in a network, in accordance with an embodiment of the present invention.

FIG. 3 illustrates a flow chart of an exemplary process of determining problems and deploying solutions in a network, in accordance with an embodiment of the present invention. The network may correspond to, for example, the network 105 of FIG. 1. The process may begin at a start block 301 where an electronic device may send a message indicating the presence of a problem. The electronic device may correspond to, for example, the electronic device 107 of FIG. 1. A problem report may then be collected at a customer care center at a next step 303. At a following step 305, traps may be set by the customer care center in the electronic device that indicated the presence of the problem. The traps may, for example, capture raw data from the electronic device, which may be useful in determining the cause and the nature of the problem indicated by the electronic device. The traps may, for example, be a tool or code in the electronic device that may be able to retrieve certain raw data from the electronic device, and the raw data may be indicative of certain errors or problems with the electronic device. The raw data may be, for example, a piece of code where an error occurred during some operation within the electronic device.

The trapped raw data from the electronic device may then be collected and stored in a repository, at a next step 307. The stored data may then be provided to OEMs, at a next step 309. The OEMs may then use the provided data to create a temporary solution for the problem at a next step 311. The electronic devices that have reported the same problem may then be provided with the temporary solution created by the OEMs, at a next step 313. Meanwhile the OEMs may create a permanent solution for the problem, at a next step 315. The permanent solution may then be disseminated to the electronic devices that have reported the problem, at a next step 317. Electronic devices that could potentially encounter the same problem, but which have not yet reported the problem may also receive the permanent solution, at a next step 319. At a last step 321, the traps in the electronic device and monitoring of problems at the customer care center may be reset and ready to receive reports of other problems as they arise in the system.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile network that facilitates solving problems in at least one mobile electronic device in the network, the customer care network comprising:
    at least one server comprising one or more circuits, the at least one server operable to receive at least one report of at least one problem experienced by the mobile electronic device;
    the at least one server operable to determine the mobile electronic device is in a vicinity of a fixed set of routes, based on the determination of the vicinity a fixed set of routes of the mobile electronic device, the at least one server cause automatic collection for a specific duration of time, by the mobile electronic device while within the particular vicinity of a fixed set of routes, a plurality of measured parameters as raw data related to the at least one problem; wherein the plurality of measured parameter comprises quality of service parameters, average download time, average number of dropped packages per download and average number of attempts per download;
    the at least one server operable to receive the collected plurality of measured parameters, provide the collected plurality of measured parameters as raw data to an original equipment manufacturer (OEM) of the mobile electronic device and to diagnose the at least one problem experienced by the mobile electronic device, based upon the collected plurality of measured parameters and analysis from the OEM; the at least one server provides a temporary solution to the at least one problem using the collected plurality of measured parameters and analysis from the OEM, the temporary solution comprising executable instructions for converting at least one of firmware, software, or a parameter in the mobile electronic device, the temporary solution to be distributed, to the mobile electronic device by the at least one server to fix the at least one problem in the mobile electronic device
    the at least one server further uses the analysis from the OEM and the collected plurality of measured parameters associated with at least one problem to create a permanent solution for the at least one problem based on the efficacy of the temporary solution as determined by additional collection of the plurality of measured parameters as raw data, wherein the temporary solution and the permanent solution are different; the permanent solution is distributed to the mobile electronic device and a plurality of other mobile electronic devices which have not reported the at least one problem, wherein the plurality of other mobile electronic devices are structural similar to the mobile electronic device.

2. The mobile network according to claim 1 further comprising a repository that stores information regarding the at least one problem reported by the mobile electronic device and the temporary solution provided by the at least one server.

3. The mobile network according to claim 1, wherein the at least one server sends to the mobile electronic device a request for data associated with the at least one problem reported by the mobile electronic device.

4. The mobile network according to claim 1, wherein the mobile electronic device comprises at least one of the following: a mobile handset, a cellular telephone, a pager, a personal computer, and a personal digital assistant (PDA).

5. The mobile network according to claim 1, wherein the at least one problem comprises at least one of the following:
    the mobile electronic device being newly added and has not yet been used in the mobile network;
    at least one changed network parameter or configuration not yet reflected in the mobile electronic device;
    faulty hardware on the mobile electronic device; and
    newly released software causing at least one problem in the mobile electronic device.

6. A method for solving problems in at least one mobile electronic device in a mobile network, the mobile electronic device comprising at least one of firmware and software stored in a computer usable medium the method comprising:
    performing, at least in part by one or more circuits in on or more servers;

receiving a report regarding at least one problem in the mobile electronic device in the mobile network;

determine the mobile electronic device is in a vicinity of a fixed set of routes, based on the determination of the vicinity a fixed set of routes of the mobile electronic device, the at least one server cause automatic collection for a specific duration of time, by the mobile electronic device while within the particular vicinity of a fixed set of routes, a plurality of measured parameters as raw data related to the at least one problem; wherein the plurality of measured parameter comprises quality of service parameters, average download time, average number of dropped packages per download and average number of attempts per download;

receiving the collected plurality of measured parameters to the one or more servers;

providing the collected plurality of measured parameters as raw data to an original equipment manufacturer (OEM) of the mobile electronic device;

diagnosing the at least one problem based upon the collected plurality of measured parameters and analysis from the OEM;

providing a temporary solution to the at least one problem using the collected plurality of measured parameters and analysis from the OEM, the temporary solution comprising executable instruction for converting the at least one of firmware and software stored in the computer usable medium in the mobile electronic device;

distributing the temporary solution to fix the at least one problem in the mobile electronic device;

providing a second solution to the at least one problem, the second solution comprising executable instructions for converting the least one of firmware and software stored in the computer usable medium in the mobile electronic device;

distributing the second solution to other mobile electronic devices in the mobile network similar to the mobile electronic device, wherein the other mobile electronic devices did not report the at least one problem.

7. The method according to claim 6 further comprising, after receiving the report of the at least one problem, sending to the mobile electronic device a request for data associated with the at least one problem from an analytics engine server.

8. The method according to claim 6 and further comprising providing the second solution for the at least one problem using the data associated with the at least one problem and analysis from the OEM, and wherein the first solution and the second solution are different.

9. The method according to claim 6, wherein the mobile electronic device comprises at least one of a mobile handset, a cellular telephone, a pager, a personal computer, and a personal digital assistant (PDA).

10. The method according to claim 6, wherein the at least one problem comprises at least one of the following:

the mobile electronic device being newly added and has not yet been used in the network;

at least one changed network parameter or configuration not yet reflected in the mobile electronic device;

faulty hardware on the mobile electronic device; and newly released software causing at least one problem in the at least one mobile electronic device.

11. A mobile network for conducting device management of at least one mobile electronic device, the mobile network comprising:

a device management (DM) server comprising one or more circuits, the DM server operable for managing the mobile electronic device;

a third party analytics engine server comprising one or more circuits, the third party analytics engine server operable for storing diagnostic information;

wherein the third party analytics engine server receives at least one report of at least one problem experienced by the mobile electronic device;

wherein the third party analytics engine server is operable to:

receiving a report regarding at least one problem in the mobile electronic device in the mobile network;

determine the mobile electronic device is in a vicinity of a fixed set of routes, based on the determination of the vicinity a fixed set of routes of the mobile electronic device, the at least one server cause automatic collection for a specific duration of time, by the mobile electronic device while within the particular vicinity of a fixed set of routes, a plurality of measured parameters as raw data related to the at least one problem; wherein the plurality of measured parameter comprises quality of service parameters, average download time, average number of dropped packages per download and average number of attempts per download;

receiving the collected plurality of measured parameters to the third party analytic engine server;

providing the collected plurality of measured parameters as raw data to an original equipment manufacturer (OEM) of the mobile electronic device;

diagnosing the at least one problem based upon the collected plurality of measured parameters and analysis from the OEM;

providing a temporary solution to the at least one problem using the collected plurality of measured parameters and analysis from the OEM, the temporary solution comprising executable instruction for converting the at least one of firmware and software stored in the computer usable medium in the mobile electronic device;

distributing the temporary solution to fix the at least one problem in the mobile electronic device;

providing a second solution to the at least one problem, the second solution comprising executable instructions for converting the least one of firmware and software stored in the computer usable medium in the mobile electronic device;

distributing the second solution to other mobile electronic devices in the mobile network similar to the mobile electronic device, wherein the other mobile electronic devices did not report the at least one problem.

12. The mobile network according to claim 11, wherein the DM server facilitates the automatic collection of the diagnostic information by the third party analytic engine server from the mobile electronic device.

13. The mobile network according to claim 12, wherein the automatic collection of the diagnostic information by the mobile electronic device is achieved by at least one of the following: at least one trap, at least one diagnostic condition, and at least one trigger configured in the at least one mobile electronic device.

14. The mobile network according to claim 13, wherein the third party analytic engine server automatically collects the diagnostic information from a plurality of mobile electronic devices in the network, and wherein the automatic collection of diagnostic information by the mobile electronic device is achieved by at least one of the following: at least one trap, at least one diagnostic condition, and at least one trigger configured in at least of the plurality mobile electronic device.

15. The mobile network according to claim 11, wherein the mobile electronic device comprises one or the following: a mobile handset, a cellular telephone, a personal digital assistant, a pager, and a personal computer.

\* \* \* \* \*

UNITED STATES PATENT AND TRADEMARK OFFICE
CERTIFICATE OF CORRECTION

PATENT NO. : 7,809,811 B1  
APPLICATION NO. : 11/374481  
DATED : October 5, 2010  
INVENTOR(S) : Bindu R. Rao Page 1 of 1

It is certified that error appears in the above-identified patent and that said Letters Patent is hereby corrected as shown below:

In column 8, line 14, in Claim 1, delete "device" and insert -- device, --, therefor.

In column 8, line 23, in Claim 1, delete "distributed," and insert -- distributed --, therefor.

In column 8, line 65, in Claim 6, delete "medium" and insert -- medium, --, therefor.

In column 8, line 66, in Claim 6, delete "part" and insert -- part, --, therefor.

In column 8, line 66, in Claim 6, delete "on" and insert -- one --, therefor.

In column 9, line 27, in Claim 6, delete "instruction" and insert -- instructions --, therefor.

In column 9, line 37, in Claim 6, below "mobile electronic device;" insert -- distributing the second solution to the mobile electronic device; and --.

In column 10, line 2, in Claim 11, delete "DM server" and insert -- DM first server --, therefor.

In column 10, line 10, in Claim 11, after "device;" insert -- and --.

In column 11, line 2, in Claim 14, delete "analytic" and insert -- analytics --, therefor.

In column 11, line 8, in Claim 14, delete "at least of the plurality" and insert -- at least one of the plurality of --, therefor.

In column 11, line 8, in Claim 14, delete "device." and insert -- devices. --, therefor.

Signed and Sealed this  
Fourteenth Day of June, 2011

David J. Kappos  
*Director of the United States Patent and Trademark Office*